US010801579B2

(12) United States Patent
Groneberg

(10) Patent No.: US 10,801,579 B2
(45) Date of Patent: Oct. 13, 2020

(54) CENTRIFUGAL PENDULUM DEVICE AND TORSIONAL VIBRATION DAMPER COMPRISING SUCH A CENTRIFUGAL PENDULUM DEVICE

(71) Applicant: BorgWarner Inc., Auburn Hills, MI (US)

(72) Inventor: Oliver Groneberg, Waldsee (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 15/945,807

(22) Filed: Apr. 5, 2018

(65) Prior Publication Data

US 2018/0291980 A1  Oct. 11, 2018

(30) Foreign Application Priority Data

Apr. 5, 2017 (DE) .................. 10 2017 003 323
Jan. 8, 2018 (DE) .................. 10 2018 000 070

(51) Int. Cl.
*F16F 15/14* (2006.01)
*F16F 15/131* (2006.01)

(52) U.S. Cl.
CPC ...... *F16F 15/145* (2013.01); *F16F 15/13128* (2013.01)

(58) Field of Classification Search
CPC .. F16F 15/145; F16F 15/1457; F16F 15/1407; F16F 15/1492; F16F 15/1435; F16F 15/1414; F16F 15/1421; F16F 15/14; F16F 15/30; F16F 15/31; F16F 15/13128; F16F 15/13107; F16F 15/131;

(Continued)

(56) References Cited

U.S. PATENT DOCUMENTS

| 2015/0075320 A1* | 3/2015 | Verhoog | ............... F16F 15/145 |
| | | | 74/574.2 |
| 2017/0102046 A1* | 4/2017 | Oh | ......................... F16F 15/30 |

FOREIGN PATENT DOCUMENTS

| DE | 102011100868 A1 * | 11/2012 | ............ F16F 15/145 |
| DE | 102011085106 A1 | 2/2013 | |

(Continued)

OTHER PUBLICATIONS

EPO Translation of DE 102015212737 A1, Rusch et al., Jan. 12, 2017 (Year: 2018).*
EPO Translation of DE 102011100868 A1, Grahl et al., Nov. 15, 2012. (Year: 2019).*
EPO Translation of EP 0972965 A1, Eckel et al., Jan. 19, 2000. (Year: 2019).*

(Continued)

*Primary Examiner* — Daniel D Yabut
(74) *Attorney, Agent, or Firm* — Howard & Howard Attorneys PLLC

(57) ABSTRACT

The present invention relates to a centrifugal pendulum device (2) comprising a rotatable pendulum mass carrier (18) and at least one pendulum mass (28), which is arranged thereon to be moveable between two end positions relative to the pendulum mass carrier (18) due to at least one guide element (44) which extends in guide means (46, 48, 50) in the pendulum mass carrier (18) and the pendulum mass (28), wherein a damping element (52) is arranged on the pendulum mass (28) via which the pendulum mass (28) is supported or supportable on the pendulum mass carrier (18) before reaching at least one of the end positions, preferably both end positions. In addition, the present invention relates to a torsional vibration damper comprising such a centrifugal pendulum device (2).

12 Claims, 5 Drawing Sheets

Figure 1:
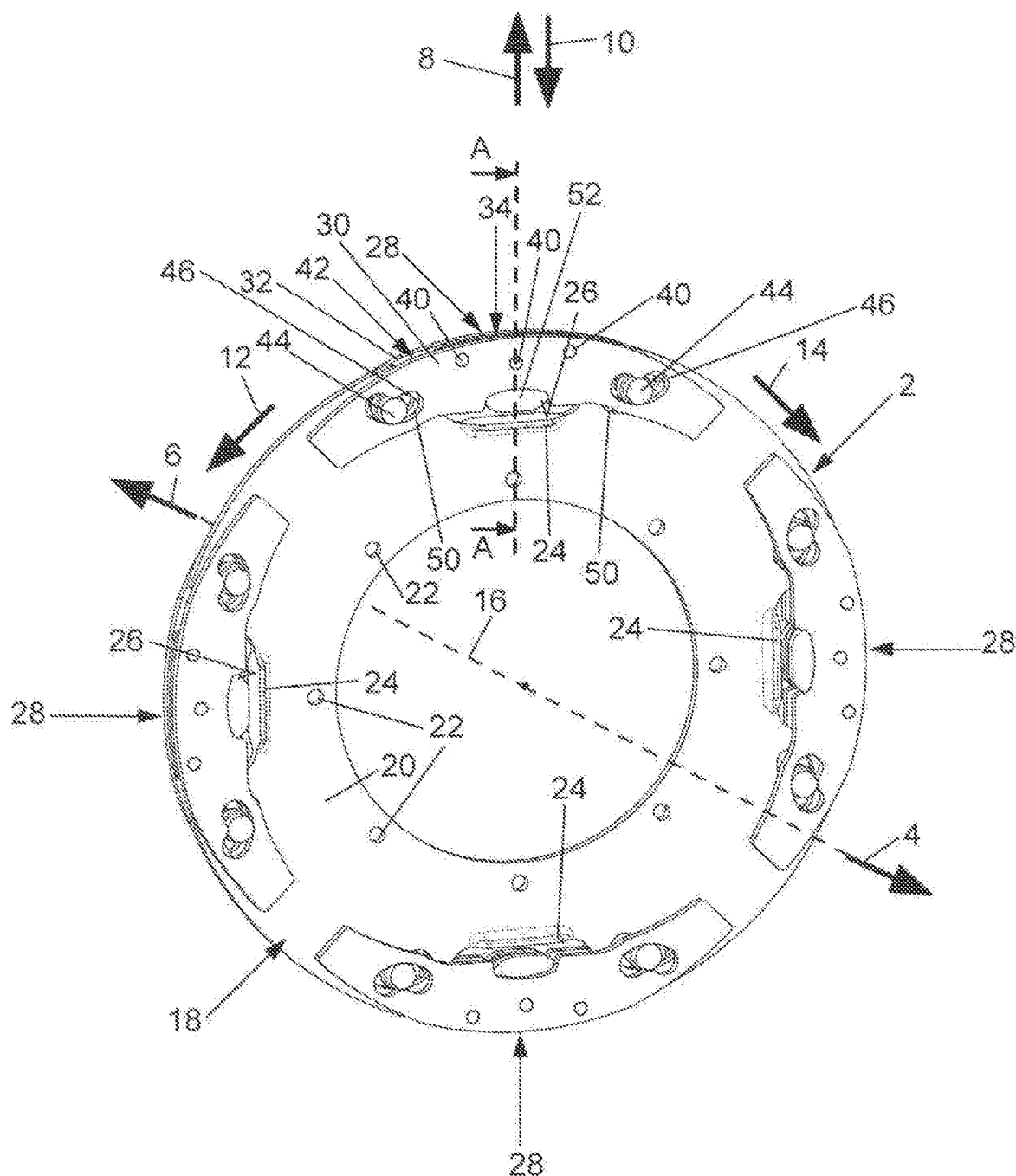

(58) Field of Classification Search
CPC .......... F16F 15/283; F16F 15/12; F16F 15/26; F16H 2045/0263; Y10T 74/2128; Y10T 74/2131; Y10T 74/2121; Y10T 74/2184
See application file for complete search history.

(56) References Cited

FOREIGN PATENT DOCUMENTS

| | | | |
|---|---|---|---|
| DE | 102012217958 A1 | 4/2014 | |
| DE | 102014213617 A1 | 2/2015 | |
| DE | 102013220287 A1 | 4/2015 | |
| DE | 102015212737 A1 * | 1/2017 | ............ F16F 15/145 |
| EP | 0972965 A1 * | 1/2000 | .......... F16F 15/1435 |
| JP | 10078082 A * | 3/1998 | .......... F16F 15/1407 |
| JP | 2000314451 A * | 11/2000 | .......... F16F 15/1407 |

OTHER PUBLICATIONS

English language abstract and machine-assisted English translation for DE 10 2011 085 106 extracted from espacenet.com database on Nov. 26, 2018, 18 pages.

English language abstract and machine-assisted English translation for DE 10 2012 217 958 extracted from espacenet.com database on Nov. 26, 2018, 13 pages.

English language abstract and machine-assisted English translation for DE 10 2014 213 617 extracted from espacenet.com database on Nov. 26, 2018, 27 pages.

Machine-assisted English language abstract and machine-assisted English translation for DE 10 2013 220 287 extracted from espacenet.com database on Nov. 26, 2018, 16 pages.

\* cited by examiner

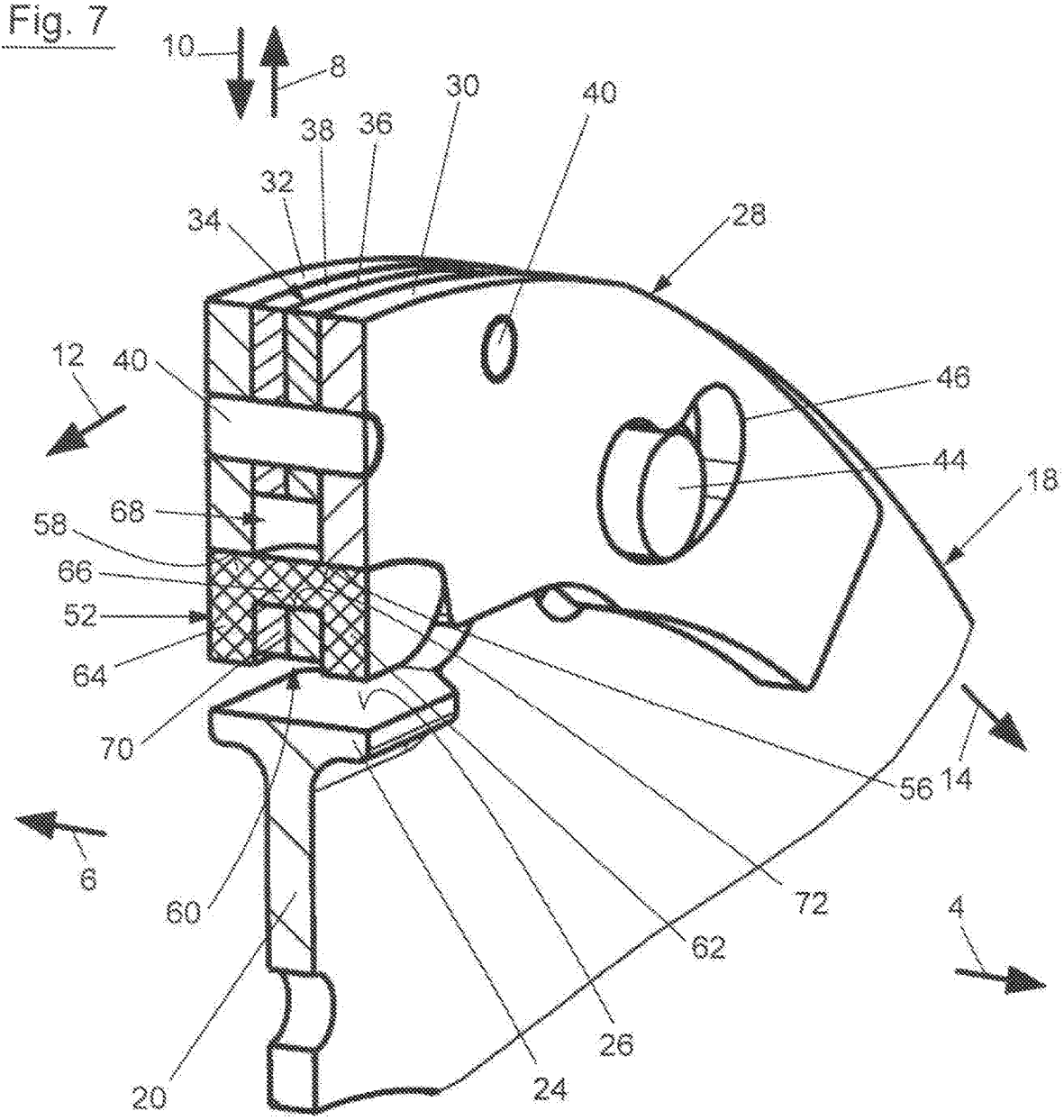

CENTRIFUGAL PENDULUM DEVICE AND TORSIONAL VIBRATION DAMPER COMPRISING SUCH A CENTRIFUGAL PENDULUM DEVICE

CROSS REFERENCE TO RELATED APPLICATIONS

This application claims the benefit of German Patent Applications No. 102017003323.4 filed Apr. 5, 2017 and No. 102018000070.3 filed Jan. 8, 2018, the disclosure of which is herein incorporated by reference in their entirety.

DESCRIPTION

The present invention relates to a centrifugal pendulum device comprising at least one rotatable pendulum mass carrier and at least one pendulum mass arranged thereon to be movable between two end positions relative to the pendulum mass carrier by at least one guide element which extends in guide means in the pendulum mass carrier and the pendulum mass.

So-called centrifugal pendulum devices are known from practice that have at least one rotatable pendulum mass carrier and at least one pendulum mass arranged thereon. The at least one pendulum mass is movable by means of at least one guide element, which extends in guide means in the pendulum mass carrier and the pendulum mass, between two end positions relative to the pendulum mass carrier, in order to minimize or damp torsional vibrations or rotary oscillations within a drivetrain—similar to a torsional vibration damper. In contrast to torsional vibration dampers, the at least one pendulum mass is not arranged in the torque transmission path of the drivetrain, but may instead be moved freely relative to the pendulum mass carrier. In order to ensure a low-noise and low-wear operation of the centrifugal pendulum device, solutions have been developed in which a damping element is arranged on the pendulum mass carrier so that the pendulum mass is supportable on the pendulum mass carrier via the damping element before reaching the end position. This solution has been proven; however, it is disadvantageous in the respect that the pendulum mass must be dimensioned relatively large in order to achieve the weight necessary for the pendulum mass to reduce the rotational or torsional vibrations.

It is therefore the object of the present invention to refine a centrifugal pendulum device of the generic type in such a way that this functions in a low-noise and low-wear way and enables an effective damping of rotational or torsional vibrations at a relatively low weight of the pendulum mass. In addition, the underlying object of the present invention is to create a torsional vibration damper with such an advantageous centrifugal pendulum device.

This problem is solved by the features listed in Patent Claim 1 or 10. Advantageous embodiments of the invention are the subject matter of the subclaims.

The centrifugal pendulum device according to the invention has a rotatable pendulum mass carrier and at least one pendulum mass arranged thereon. In contrast to the components of a torsional vibration damper, the pendulum mass is not designed to be arranged in the torque transmission path of a drivetrain. The pendulum mass carrier is preferably a disk-shaped and/or an annular disk-shaped element which is particularly preferably designed as a sheet metal part or as a shaped sheet metal part. The pendulum mass arranged thereon is preferably composed from one or more sheet metal parts. In the case of two or more pendulum masses, these are preferably arranged uniformly in the circumferential direction on the pendulum mass carrier. The at least one pendulum mass is movable between two end positions relative to the pendulum mass carrier, due to at least one guide element, preferably a rolling element or sliding element, which extends in guide means in the pendulum mass carrier on the one side and the pendulum mass on the other side, wherein the movement between the two end positions is preferably carried out essentially in the circumferential directions, wherein the movement is accompanied by a movement of the pendulum mass in the radial directions, consequently, a pendulum movement. To guarantee a low-noise and low-wear operation of the centrifugal pendulum device, a damping element is arranged on the pendulum mass, via which the pendulum mass is supported or supportable on the pendulum mass carrier before reaching at least one of the end positions, preferably both end positions. Due to the arrangement or fastening of the damping element on the pendulum mass, it is not only the pendulum mass that is moved between two end positions, but rather the damping element as well, so that the weight of the moved mass is increased in order to be able to act counter to rotational or torsional vibrations. Consequently, the pendulum mass itself may be dimensioned smaller and have a correspondingly lower weight than is the case for a centrifugal pendulum device of the generic type, in which the damping element is arranged and fastened on the pendulum mass carrier.

In one advantageous embodiment of the centrifugal pendulum device according to the invention, the pendulum mass has two pendulum mass parts which are connected to one another via connecting means. Both the two pendulum mass part and also the connecting means are preferably designed essentially as disk or plate shaped, wherein the connecting means may have additional means for connecting the pendulum mass parts to one another, for example, rivets or screws. The connecting means and likewise the pendulum mass parts may thereby be considered as one mass which is moved along with the pendulum mass and thus contributes to an increase in the total weight of the pendulum mass.

According to another advantageous embodiment of the centrifugal pendulum device according to the invention, the two pendulum mass parts are spaced apart from one another by the connecting means to create a free space lying therebetween. This has the advantage, among others, that the guide element, if necessary the rolling element, for example, may be supported or mounted or guided on both sides on the opposing pendulum mass parts in order to ensure a particularly secure guiding of the pendulum mass along the movement path.

In one particularly advantageous embodiment of the centrifugal pendulum device according to the invention, the previously mentioned free space is configured in such a way that the pendulum mass carrier is introduced or may be introduced into this free space. Thus, the preferably disk-shaped pendulum mass carrier may, for example, be permanently inserted into said free space or at least dip into said free space at least in certain positions of the pendulum mass relative to the pendulum mass carrier. Regardless of the respectively selected embodiment variant, a particularly compact structure of the centrifugal pendulum device is guaranteed.

In another advantageous embodiment of the centrifugal pendulum device according to the invention, the two pendulum mass parts are connected to the connecting means as separate components. It should be particularly understood by this that the two pendulum mass parts were initially produced separately from the connecting means during the context of the manufacturing, in order to be only subsequently connected to the connecting means and via the connecting means. This also excludes a one-piece design of the connecting means with one of the two pendulum mass parts.

In order to guarantee a particularly secure support of the pendulum mass on the pendulum mass carrier via the damping element, without thereby strongly increasing the demands on the pendulum mass, in one preferred embodiment of the centrifugal pendulum device according to the invention, a support force acting on the pendulum mass is supported or supportable directly on the two pendulum mass parts via the damping element supported on the pendulum mass carrier.

Basically, the support of the support force may additionally be carried out directly on the connecting means in the case of the previously described embodiment. It has been shown, however, that such an additional direct support of the support force on the connecting means may lead to a temporally offset support in said areas, which may be traced back to manufacturing imprecision. For this reason, in another preferred embodiment of the centrifugal pendulum device according to the invention, the support force is not directly supported or supportable on the connecting means, but instead at most indirectly, for example, via the pendulum mass parts.

To reinforce the previously described effect still more, in one particularly preferred embodiment of the centrifugal pendulum device according to the invention, the support force is indirectly supported or supportable exclusively on the pendulum mass parts.

In another advantageous embodiment of the centrifugal pendulum device according to the invention, the pendulum mass carrier has a carrier section and a support section, wherein the pendulum mass is supported or supportable on the support section by means of the damping element. It is thereby preferred if the support section is broadened by enlarging the contact surface with the damping element compared with the contacting carrier section, thus for example, in the axial direction of the centrifugal pendulum device. In this embodiment variant, a continuously overdimensioned carrier section is thus not needed in order to guarantee a large contact surface between the damping element and the pendulum mass carrier, which guarantees a secure support of the pendulum mass shortly before reaching the end position, so that a compact design of the centrifugal pendulum device is possible.

According to another advantageous embodiment of the centrifugal pendulum device according to the invention, the support section is designed as one piece with the carrier section of the pendulum mass carrier. Thus, the broadened support section may, for example, be generated or may have been generated by shaping the carrier section at a suitable location.

According to another preferred embodiment of the centrifugal pendulum device according to the invention, which depicts an alternative to the previously described embodiment, the support section of the pendulum mass carrier is fastened on the carrier section of the pendulum mass carrier as a separate component, wherein the fastening may be carried out, for example, by riveting or screwing. In other words, the support section is initially manufactured as a separate component in order to be subsequently fastened on the carrier section of the pendulum mass carrier. This simplifies not only the manufacturing of the support section, but a subsequent, exact, and, if necessary, adjusted positioning of the same on the carrier section is then possible.

In another advantageous embodiment of the centrifugal pendulum device according to the invention, the support section and/or the carrier section of the pendulum mass carrier is formed from a sheet metal part or a shaped sheet metal part in order to provide a light-weight and easily manufactured centrifugal pendulum device.

In another particularly advantageous embodiment of the centrifugal pendulum device according to the invention, the support force is supported or supportable on a side of the pendulum mass parts facing inward in a radial direction and/or facing the support section of the pendulum mass carrier in order to support the support force on the pendulum mass in particular according to need. In the case of pendulum mass parts designed substantially as disk- or plate-shaped, the support force might be carried out, for example, on the edge or edge surface of the plate or disk-shaped pendulum mass part facing inward in the radial direction and/or facing the support section.

In another preferred embodiment of the centrifugal pendulum device according to the invention, the damping element is held by the pendulum mass in a positive-locking and/or frictional locking way and/or is captively held. The positive-locking and/or frictional locking holding of the damping element by the pendulum mass has the advantage over a bonded connection, for example, adhesion, that manufacturing and assembly of the pendulum mass, and thus the entire centrifugal pendulum device, is simplified. For this reason, it is also preferred in this embodiment if the damping element is held by the pendulum mass exclusively in a positive-locking and/or frictional locking way, particularly preferably exclusively in a positive-locking way. It has proven additionally advantageous in this embodiment if the damping element is inserted between the connecting means and the pendulum mass parts in order to achieve the positive locking.

In order to realize the previously mentioned positive locking and/or frictional locking, in particular the positive locking of the damping element by the pendulum mass, in another preferred embodiment of the centrifugal pendulum device according to the invention, the damping element is held on the pendulum mass outward in the radial direction, preferably exclusively, by the pendulum mass parts. It has hereby proven additionally advantageous if the support is carried out on a side of the pendulum mass part facing the pendulum mass carrier or the support section, as this has been previously described with reference to the support of the support force.

Alternatively or supplementally to the previously described embodiment, in another advantageous embodiment of the centrifugal pendulum device according to the invention, the damping element is held on the pendulum mass inward in the radial direction, preferably exclusively, by the connecting means. By this means, a particularly secure holding is guaranteed of the damping element in a specified position inward in the radial direction. It is also advantageous in this embodiment if the damping element is held inward in the radial direction on the pendulum mass by a stirrup of the connecting means, wherein such a stirrup may be generated relatively easily, for example, by an axial recess in the connecting means described later in greater detail. The stirrup is thereby preferably designed as continuous; however, there may be an interruption.

In order to be able to hold the damping element particularly securely in a specified position on the pendulum mass in the opposing axial directions, in another preferred embodiment of the centrifugal pendulum device according to the invention, the damping element is held on the pendulum mass in the opposing axial directions preferably exclusively by the connecting means, particularly preferably by a stirrup of the connecting means, in order to particularly easily and securely arrange the damping element in a positive locking way on the pendulum mass in the axial directions.

In order to guarantee a secure positive locking arrangement of the damping element on the pendulum mass, in another particularly preferred embodiment of the centrifugal pendulum device according to the invention, a retaining groove is provided in the damping element, whereas an axial recess is formed in the connecting means. The axial recess may thereby be designed both as a window-like recess and also as an incision into the edge side in the connecting means. The damping element is dimensioned in such a way that it is introduced or may be introduced into the recess in the axial direction, in order to be displaced or to be displaceable, preferably inward in the radial direction by inserting an edge of the recess into the retaining groove transverse to the axial direction. In the latter position, the edge of the recess, which preferably also forms the edge of the previously mentioned stirrup, extends into the retaining groove so that the damping element is supportable ands is thus held on the connecting means or on the stirrup in a positive locking way in the two opposing axial directions. By this means, a particularly simple assembly of the pendulum mass, including the damping element, is possible.

The damping element may be basically composed from any material which has damping properties, wherein the damping element should be formed from a material that differs from the pendulum mass parts, the pendulum mass carrier, and/or the support section of the pendulum mass carrier. Thus, in another advantageous embodiment of the centrifugal pendulum device according to the invention, it is preferred if the damping element is softer than the pendulum mass parts and/or the pendulum mass carrier and/or the support section of the pendulum mass carrier and/or the guide element. Alternatively or supplementally, it is preferred if the damping element is designed to be elastic. Alternatively or supplementally, the damping element may be formed from a plastic, for example, from a rubber.

According to another preferred embodiment of the centrifugal pendulum device according to the invention, the damping element is designed as one piece, in order to both simplify manufacturing and also to ensure the previously described simultaneous support of the two pendulum mass parts on the damping element, by which means, in particular, certain manufacturing imprecisions may be compensated.

The torsional vibration damper according to the invention has an input side and an output side. The input side and the output side may also be described as the primary element and the secondary element of a torsional vibration damper. Spring elements are preferably arranged between the input side and the output side, enabling a relative rotation between the input side and the output side counter to the spring force of these spring elements or effecting a torsionally elastic coupling. In addition, the torsional vibration damper has a centrifugal pendulum device of the previously described type according to the invention. The torsional vibration damper in connection with the centrifugal pendulum device is particularly suited for countering rotational or torsional vibrations within the drivetrain.

In one preferred embodiment of the invention, the pendulum mass carrier, preferably its carrier section, is arranged or fastened on the input side or output side of the torsional vibration damper. It has hereby proven particularly advantageous if the pendulum mass carrier is arranged or fastened on the output side of the torsional vibration damper.

In one particularly preferred embodiment of the torsional vibration damper according to the invention, the pendulum mass carrier or its carrier section forms the input or output side, preferably the output side, in order to achieve a particularly compact design of the torsional vibration damper. It is thus possible, for example, to design the entire pendulum mass carrier or at least its carrier section as one piece with the input side or the output side, preferably with the output side.

In one advantageous embodiment of the torsional vibration damper according to the invention, at least one rotary driver of the torsional vibration damper is provided on the pendulum mass carrier or on its carrier section, wherein it is preferred in this case if the rotary driver, which is in operative connection with the previously mentioned spring elements, is designed as one piece with the pendulum mass carrier or its carrier section.

Figure 2:
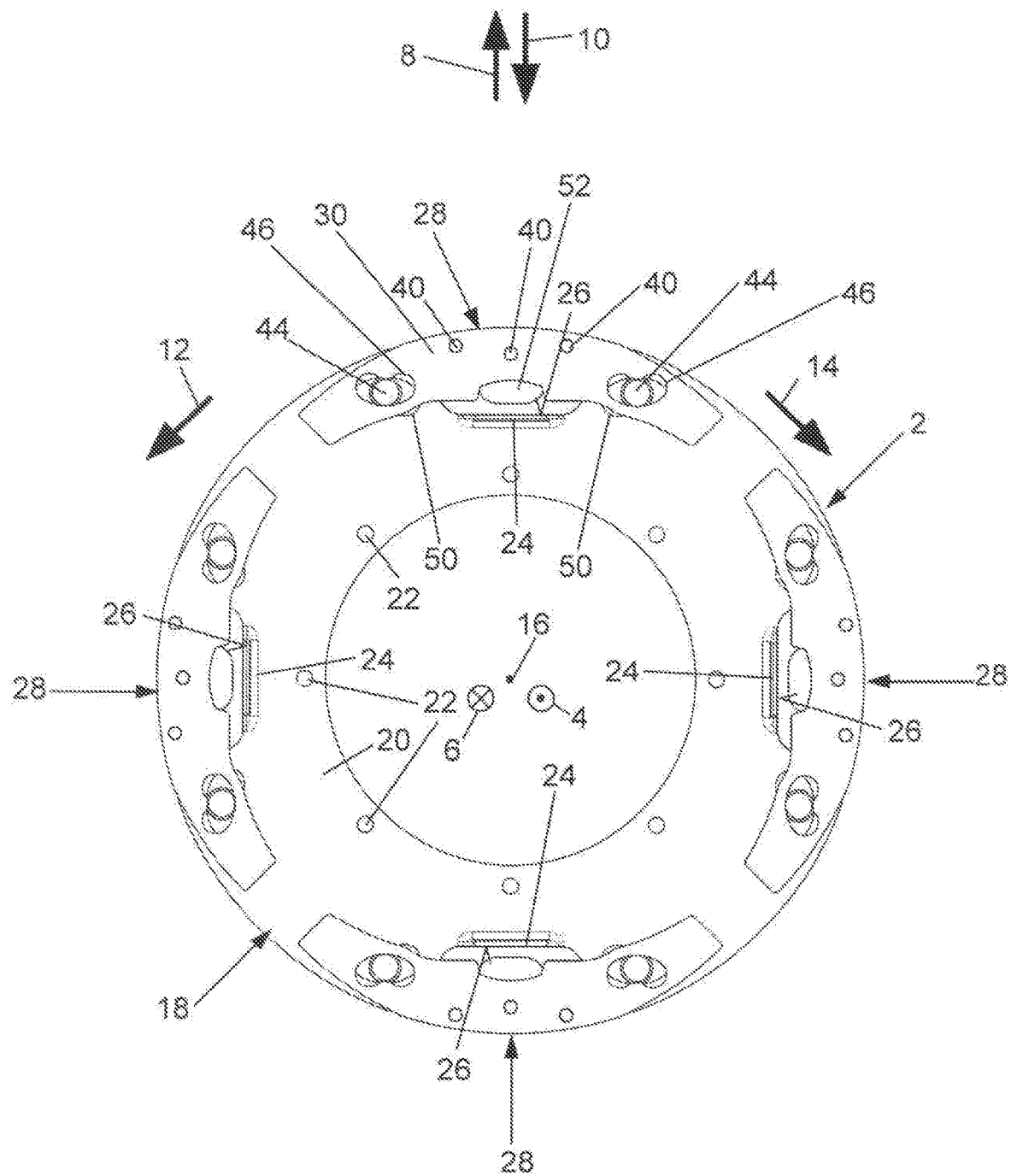
Figure 3:
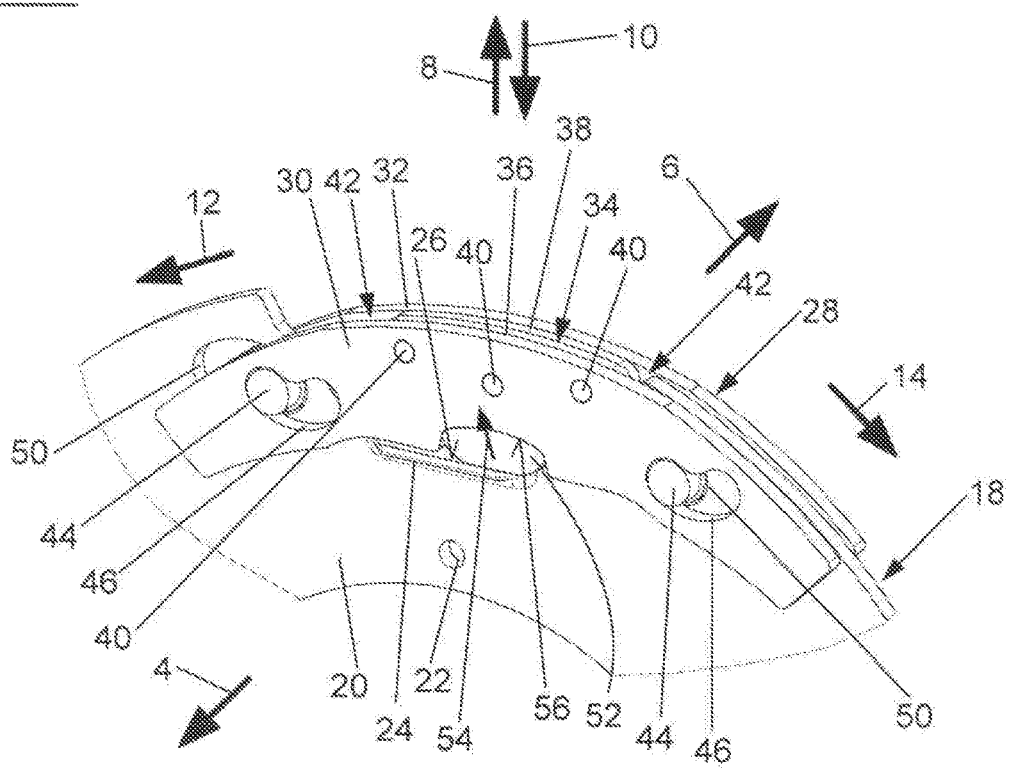
Figure 4:
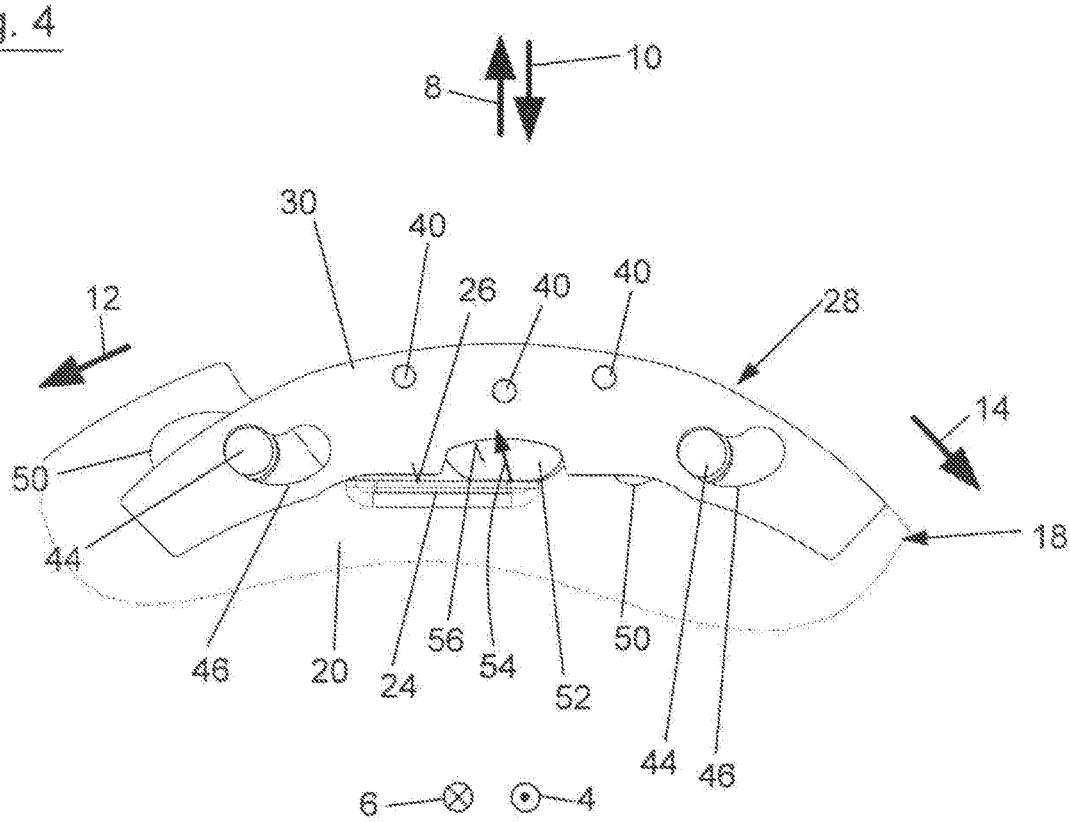
Figure 5:
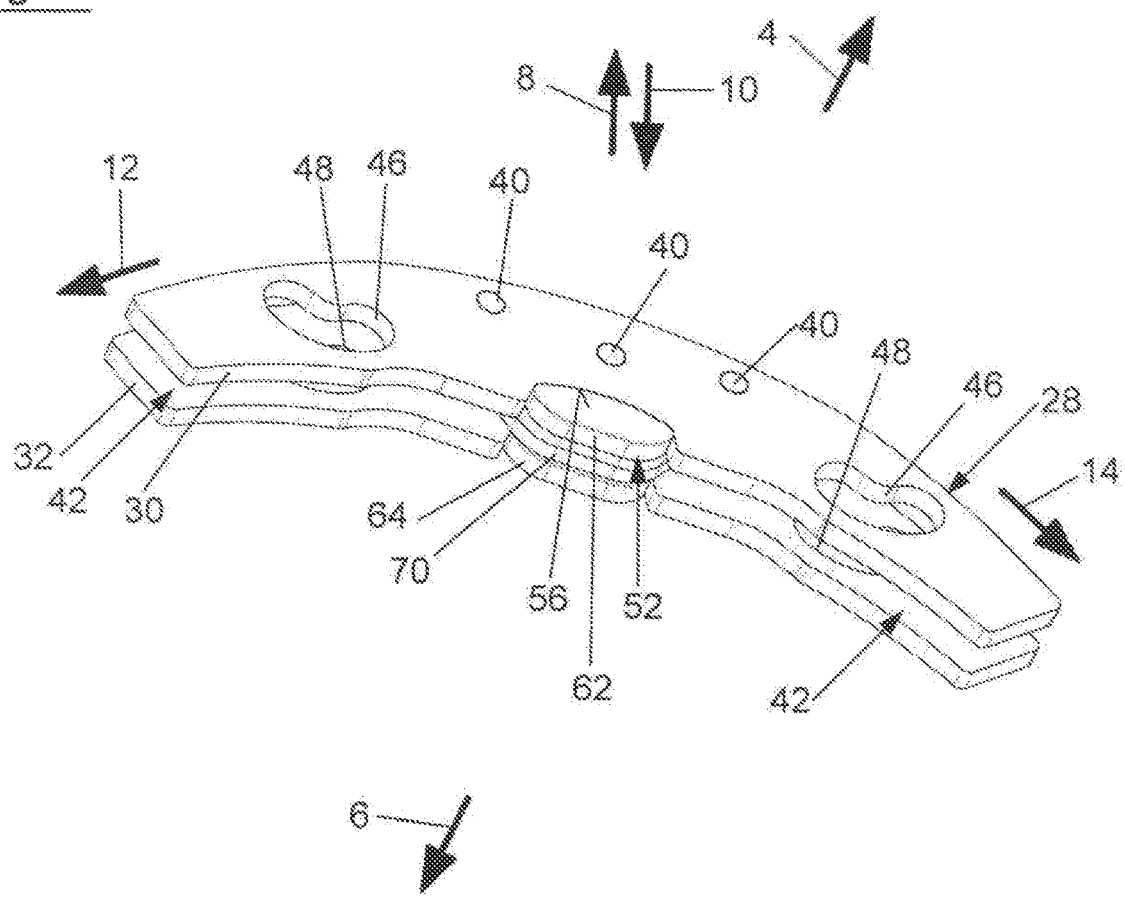
Figure 6:
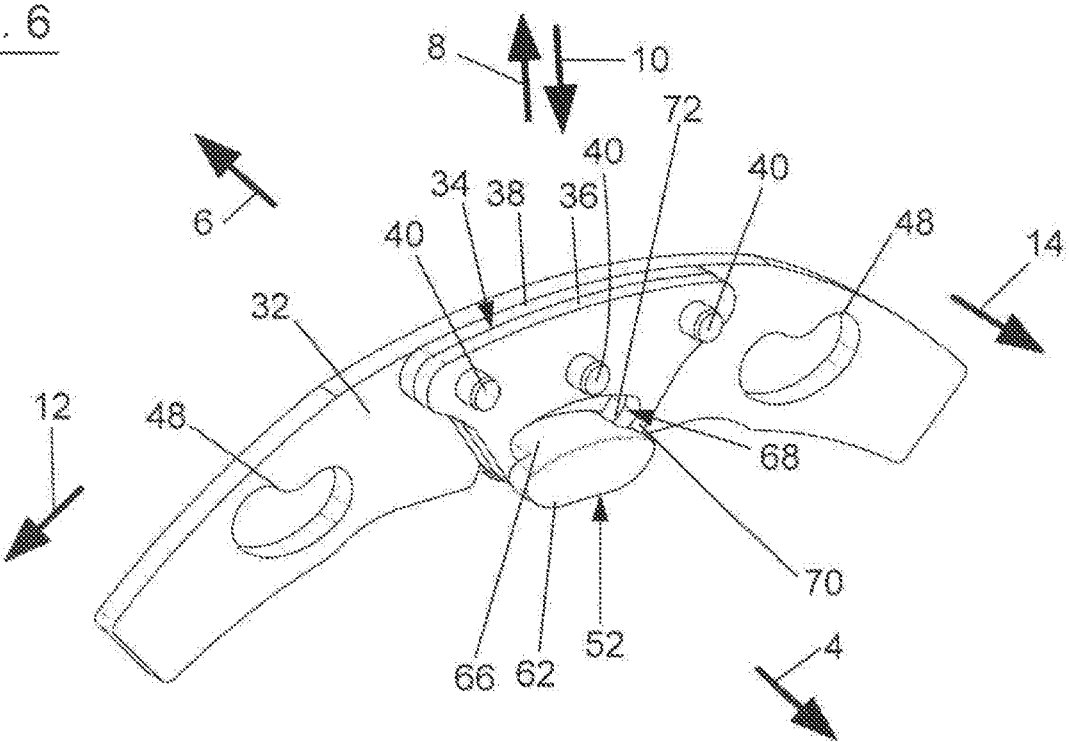

The invention will be subsequently described in greater detail with the aid of an exemplary embodiment with reference to the appended drawings. As shown in:

FIG. 1 a perspective depiction of a centrifugal pendulum device according to one embodiment of the invention, FIG. 2 a front view of the centrifugal pendulum device according to FIG. 1, FIG. 3 a perspective depiction of a section from FIG. 1 with a pendulum mass, FIG. 4 the section from FIG. 3 in a front view, FIG. 5 a perspective depiction of a pendulum mass together with the damping element from FIG. 1, FIG. 6 a perspective depiction of the pendulum mass from FIG. 5 in connection with the damping element while omitting one of the two pendulum mass parts, and FIG. 7 a perspective cross-sectional view along the line A-A in FIG. 1.

FIGS. 1 and 2 show a centrifugal pendulum device 2 for the drivetrain of a motor vehicle. In the figures, opposite axial directions 4, 6, opposite radial directions 8, 10, and opposite circumferential directions 12, 14 of centrifugal pendulum device 2 are indicated by corresponding arrows, wherein centrifugal pendulum device 2 or the pendulum mass carrier subsequently described in greater detail has an axis of rotation 16 extending in axial directions 4, 6.

Centrifugal pendulum device 2 has a pendulum mass carrier 18 rotatable about axis of rotation 16. Pendulum mass carrier 18 extends in circumferential directions 12, 14 and is designed as plate or disk shaped, more precisely, as annular disk shaped, wherein annular disk shaped pendulum mass carrier 18 extends in a plane spanned by radial directions 8, 10. Pendulum mass carrier 18 is composed essentially from a carrier section 20 in which—inward in radial direction 10—fastening openings 22 are arranged distributed in circumferential directions 12, 14 for fastening on a torque transmitting component of a drivetrain, and multiple support sections 24 distributed in circumferential direction 12, 14 with a support surface 26 facing outward in radial direction 8, wherein support sections 24 are broadened compared with contacting carrier section 20, thus are broader than carrier section 20 in axial direction 4, 6. Support surface 26 is enlarged by this means, which will be subsequently discussed again in greater detail. Carrier section 20 and support section 24 of pendulum mass carrier 18 are designed as one piece with one another. Analogously, support section 24 forms a shaped part of carrier section 20, wherein carrier section 20 and support section 24 are formed from a sheet metal part or a shaped sheet metal part. Alternatively, support section might also be fastened on carrier section 20 as a separate component, for example, through riveting or welding, wherein it is also preferred in this case if support section 24 and carrier section 20 are each formed from a sheet metal part or a shaped sheet metal part.

Multiple pendulum masses 28 are arranged on pendulum mass carrier 18 outward in radial direction 8. Pendulum masses 28 are thereby arranged on pendulum mass carrier 18 uniformly distributed in circumferential direction 12, 14. Each of pendulum masses 28 has two pendulum mass parts 30, 32 which are essentially designed as disk- or plate-shaped, wherein two pendulum mass parts 30, 32 are arranged opposite one another in the axial direction. Two pendulum mass parts 30, 32 are thereby connected to one another via connecting means 34. Connecting means 34 is composed essentially from two disk- or plate-shaped spacers 36, 38 and three pin connections, whose pins 40 extend through pendulum mass part 30, spacers 36, 38, and pendulum mass part 32 in order to create the connection specified between pendulum mass parts 30, 32 and spacers 36, 38 of connecting means 34. Connecting means 34 is thereby arranged centrally between two pendulum mass parts 30, 32, so that an intermediate free space 42 is formed in each case in axial direction 4, 6 between the ends of pendulum mass parts 30, 32 facing in circumferential direction 12 and the ends of pendulum mass parts 30, 32 facing in circumferential direction 14. Consequently, two pendulum mass parts 30, 32 are spaced apart from one another in axial direction 4, 6 in such a way by connecting means 34 that pendulum mass carrier 18 is inserted or insertable into free space 42 in order to guarantee a particularly compact design of centrifugal pendulum device 2.

It is additionally clear from the preceding description that two pendulum mass parts 30, 32 are initially designed as separate from connecting means 34 or spacers 36, 38 of the same, which means that two pendulum mass parts 30, 32 are connected as separate components to connecting means 34 via pins 40. By this means, a particularly simple manufacturing and assembly is possible of pendulum mass parts 30, 32, connecting means 34, and the damping element, to be described later in more detail.

In addition, two guide elements 44, which are essentially designed as cylindrical rolling elements and extending in axial directions 4, 6, are assigned to each pendulum mass 28. Two guide elements 44 are arranged between those ends of pendulum mass parts 30, 32, between which said free space 42 is designed. Thus, guide elements 44 extend on the one side in axial direction 4 into a guide means 46 in pendulum mass part 30 and on the other side in axial direction 6 into guide means 48 in pendulum mass part 32. In contrast, guide element 44 extends through a guide means 50 provided in pendulum mass carrier 18 inside of free space 42. Whereas two guide means 46, 48 are designed as essentially curved in the same direction and are congruent in axial direction 4, 6, guide means 50 inside of pendulum mass carrier 18 have an opposing curve. Guide elements 44, in conjunction with guide means 46, 48, 50, enable a pendulum movement of pendulum mass 28 in circumferential direction 12, 14 and in radial direction 8, 10 between two end positions, wherein a center position of pendulum mass 28 between the two end positions is shown in FIGS. 1, 2, and 7.

In addition, a damping element 52 is arranged on pendulum mass 28 and is thus movable, relative to pendulum mass carrier 18, together with the pendulum mass. Damping element 52 is designed as softer than pendulum mass parts 30, 32 and pendulum mass carrier 18, more precisely, support section 24 thereof. Damping element 52 is thus designed as one piece formed from a plastic, in particular, rubber. In addition, damping element 52 is designed as elastic and also softer than guide elements 44.

As is indicated in FIGS. 3 and 4, pendulum mass 28 is supported or supportable on pendulum mass carrier 18 via damping element 52 prior to reaching the end position lying in circumferential direction 14, wherein this correspondingly applies for the end position of pendulum mass 28 lying in circumferential direction 12. More precisely, damping element 52, which is arranged on pendulum mass 28 and thus contributes to an increase of the weight moved, is supported or supportable on support surface 26 of support section 24 of pendulum mass carrier 18, wherein support section 24—as already previously indicated—is broadened by enlarging the contact surface with damping element 52 compared with contacting carrier section 20 of pendulum mass carrier 18, as this is particularly clear in FIG. 7. Due to the support of pendulum mass 28 via damping element 52 prior to reaching the respective end position relative to pendulum mass carrier 18, a particularly low noise operation of centrifugal pendulum device 2 is guaranteed.

A support force 54 acts on pendulum mass 28 as a consequence of the movement in the direction of the end position located in circumferential direction 14 via damping element 52 supported on support section 24 of pendulum mass carrier 18, according to FIGS. 3 and 4. Support force 54 thereby acts directly on two pendulum mass parts 30, 32 or support force 54 is supported or supportable on the same. Stated more precisely, support force 54 is supported or supportable on the sides 56, 58 of pendulum mass parts 30, 32 facing inward in radial direction 10 and/or support section 24 of pendulum mass carrier 18, wherein sides 56, 58 may also be the edges or edge surfaces of pendulum mass parts 30, 32 formed essentially as disk- or plate-shaped. Support force 54 is additionally merely indirectly, thus not directly, supported or supportable on connecting means 34, as this is particularly clear in FIGS. 6 and 7, which traces back to the specific arrangement and shaping of connecting means 34, which is to be subsequently described in greater detail. In conclusion, it should be initially noted, that damping element 52 is supported or supportable exclusively directly on said sides 56, 58 of pendulum mass parts 30, 32 in the embodiment shown.

In order to be able to arrange and fasten damping element 52 securely and easily on pendulum mass 28, said damping element is held captively in a positive locking and/or frictional locking way by pendulum mass 28, wherein damping element 52 in the embodiment shown is held in an advantageous way in an exclusively positive locking way on pendulum mass 28. For this purpose, damping element 52 is inserted in a positive locking way between connecting means 34 and pendulum mass parts 30, 32, as this is to be subsequently described.

As is particularly clear from FIGS. 5 through 7, a retaining groove 60 extending in circumferential direction 12, 14 is designed in the side of damping element 52 facing inward in radial direction 10 and facing pendulum mass carrier 18 or support section 24 of pendulum mass carrier 18, which groove divides damping element 52 in axial direction 4, 6 into two opposite outer sections 62, 64 and an intermediate section 66. An axial recess 68, which is particularly clear in FIG. 6 and extends through in axial direction 4, 6, is designed in connecting means 34, more precisely in spacers 36, 38 of connecting means 34. Axial recess 68 is thereby provided in such a way that it is delimited inwardly in radial direction 10 by a stirrup 70 which is designed as one piece with spacers 36, 38, wherein stirrup 70 has an edge 72 facing axial recess 68.

When viewed from the front, damping element 52 and axial recess 68 have essentially the same shape or outer contour, wherein axial recess 68 is dimensioned as slightly larger. This enables that damping element 52 may be initially inserted into axial recess 68 in one of axial directions 4, 6, in order to displace damping element 52 inward in radial direction 10 upon reaching the insertion position, so that edge 72 of stirrup 70 is immersed in axial direction 8 into retaining groove 60 within damping element 52, as this is clear from FIGS. 5 through 7. Stirrup 70 thereby immerses deeply in axial direction 8 into retaining groove 60 in such a way that two outer sections 62, 64 of damping element 52 project inward in radial direction 10 over stirrup 70. In this position, it is already guaranteed that damping element 52 is fastened on connecting means 34 in both opposing axial directions 4, 6.

In order to complete the assembly of pendulum mass 28 and to complete the previously mentioned positive locking fastening of damping element 52 on pendulum mass 28, two pendulum mass parts 30, 32 are subsequently connected to one another via connecting means 34. In the assembled state of pendulum mass 28, damping element 52 is thus held on pendulum mass 28 outward in radial direction 8, preferably exclusively, by pendulum mass parts 30, 32 with support on sides 56, 58, in that outer section 62 is supported on side 56, whereas outer section 64 is supported on side 58. In contrast, damping element 52 is held inward in radial direction 10 exclusively by connecting means 34, more precisely, by stirrup 70 of connecting means 34, in that intermediate section 66 of damping element 52 is supported thereon. Damping element is held on pendulum mass 28 in opposing axial directions 4, 6 likewise by connecting means 34, more precisely, by stirrup 70 of connecting means 34, in that outer section 62 is supported or supportable in axial direction 6 and outer section 64 of damping element 52 is supported or supportable in axial direction 4 on stirrup 70 of connecting means 34. In the embodiment shown, it may also be stated that damping element 52 is held on pendulum mass 28 in opposing axial directions 4, 6 exclusively by connecting means 34 or stirrup 70 of connecting means 34.

The torsional vibration damper, not depicted in any detail, has an input side on which an input torque may be applied, and an output side, wherein the input and output sides are in rotary driving connection with one another via spring devices which cause a torsionally elastic coupling of the input side with the output side. In addition, the torsional vibration damper has a centrifugal pendulum device 2 of the previously described type. The centrifugal force of pendulum device 2 is thereby connected to the torsional vibration damper in such a way that pendulum mass carrier 18 is arranged or fastened on the input or output side, preferably on the output side, of the torsional vibration damper, wherein this may be carried out, for example, by riveting or screwing via fastening openings 22 in pendulum mass carrier 18. Alternatively, pendulum mass carrier 18 or carrier section 20 thereof may, however also form the input or output side of the torsional vibration damper. In this case, it is additionally preferred if pendulum mass carrier 18 or carrier section 20 has at least one rotary driver, which forms the rotary driver of the input or output side for operative connection with the intermediate spring device.

REFERENCE SIGN LIST

2 Centrifugal pendulum device
4 Axial direction
6 Axial direction
8 Radial direction
10 Radial direction
12 Circumferential direction
14 Circumferential direction
16 Axis of rotation
18 Pendulum mass carrier
20 Carrier section
22 Fastening opening
24 Support section
26 Support surface
28 Pendulum mass
30 Pendulum mass part
32 Pendulum mass part
34 Connecting means
36 Spacer
38 Spacer
40 Pins
42 Free space
44 Guide element
46 Guide means
48 Guide means
50 Guide means
52 Damping element
54 Support force
56 Side
58 Side
60 Retaining groove
62 Outer section
64 Outer section
66 Intermediate sections
68 Axial recess
70 Stirrup
72 Edge

The invention claimed is:
1. A centrifugal pendulum device comprising:
a rotatable pendulum mass carrier and at least one pendulum mass having two pendulum mass parts connected to one another via connecting means by which the two pendulum mass parts are spaced apart from one another while creating an intermediate free space into which the pendulum mass carrier is inserted, the at least one pendulum mass being arranged on the pendulum mass carrier to be moveable between two end positions relative to the pendulum mass carrier due to at least one guide element that extends in guide means in the pendulum mass carrier and the at least one pendulum mass such that the at least one pendulum mass is supported on the pendulum mass carrier before reaching at least one of the end positions; and
a damping element being held captively between the connecting means and the pendulum mass parts by a retaining groove designed in the damping element and an axial recess designed in the connecting means, the damping element being insertable into the axial recess in an axial direction and displaceable inward in a radial direction by inserting one edge of the axial recess into the retaining groove transverse to the axial direction, wherein the damping element is held on the at least one pendulum mass in opposing axial directions in the retaining groove by a stirrup of the connecting means, the at least one pendulum mass being supported on the pendulum mass carrier before reaching at least one of the end positions,
wherein the damping element and the axial recess have the same shape of outer contour, wherein the outer contour of the axial recess is dimensioned larger than the outer contour of the damping element such that damping element is initially insertable into the axial recess in one of the opposing axial directions in order to displace the damping element inward in the radial direction upon reaching an insertion position, so that an edge of the stirrup is immersible in one of the opposing axial directions into the retaining groove within the damping element, and wherein the pendulum mass carrier has a carrier section and a support section on which the at least one pendulum mass is supported by the damping element, the support section being broadened relative to the carrier section by enlarging contact surface with the damping element and being designed as one piece with the carrier section, or is fastened on the carrier section as a separate component, the support section and/or the carrier section being formed from sheet metal.

2. The centrifugal pendulum device according to claim 1, wherein the two pendulum mass parts are connected to the connecting means as separate components.

3. The centrifugal pendulum device according to claim 1, wherein the pendulum mass parts exclusively directly support a force acting on the at least one pendulum mass via the damping element.

4. The centrifugal pendulum device according to claim 3, wherein the pendulum mass parts support the force on a side of the pendulum mass parts facing inward in a radial direction and/or facing the support section.

5. The centrifugal pendulum device according to claim 1, wherein the damping element is designed as softer than the pendulum mass parts and/or the pendulum mass carrier and/or the support section of the pendulum mass carrier and/or the guide element, wherein the damping element is designed as elastic and/or as one piece, and/or is formed from a plastic.

6. The centrifugal pendulum device according to claim 1, wherein the stirrup is deeply immersible in one of the opposing axial directions into the retaining groove in such a way that two outer sections of damping element project inward in the radial direction over the stirrup.

7. A torsional vibration damper comprising:
an output side, wherein a rotatable pendulum mass carrier is arranged on the output side, and forms the output side, and at least one rotary driver is provided on the pendulum mass carrier;
at least one pendulum mass having two pendulum mass parts connected to one another via connecting means by which the two pendulum mass parts are spaced apart from one another while creating an intermediate free space into which the pendulum mass carrier is inserted, the at least one pendulum mass being arranged on the pendulum mass carrier to be moveable between two end positions relative to the pendulum mass carrier due to at least one guide element, which extends in guide means in the pendulum mass carrier and the at least one pendulum mass; and
a damping element arranged on the at least one pendulum mass via which the at least one pendulum mass is supported on the pendulum mass carrier before reaching at least one of the end positions, the damping element being held captively between the connecting means and the pendulum mass parts by a retaining groove designed in the damping element and an axial recess designed in the connecting means, wherein the damping element is insertable into the axial recess in an axial direction and displaceable inward in a radial direction by inserting one edge of the axial recess into the retaining groove transverse to the axial direction, and wherein the damping element is held on the at least one pendulum mass in opposing axial directions in the retaining groove by a stirrup of the connecting means, wherein the damping element and the axial recess have the same shape of outer contour, wherein the outer contour of the axial recess is dimensioned larger than the outer contour of the damping element such that damping element is initially insertable into the axial recess in one of the opposing axial directions in order to displace the damping element inward in the radial direction upon reaching an insertion position, so that an edge of the stirrup is immersible in one of the opposing axial directions into the retaining groove within the damping element, and wherein the pendulum mass carrier has a carrier section and a support section on which the at least one pendulum mass is supported by the damping element, the support section being broadened relative to the carrier section by enlarging contact surface with the damping element and being designed as one piece with the carrier section, or is fastened on the carrier section as a separate component, the support section and/or the carrier section being formed from sheet metal.

8. The torsional vibration damper according to claim 7, wherein the pendulum mass parts exclusively directly support a force acting on the at least one pendulum mass via the damping element.

9. The torsional vibration damper according to claim 8, wherein the pendulum mass parts support the force on a side of the pendulum mass parts facing inward in a radial direction and/or facing the support section.

10. The torsional vibration damper according to claim 7, wherein the damping element is designed as softer than the pendulum mass parts and/or the pendulum mass carrier and/or the support section of the pendulum mass carrier and/or the guide element such that the damping element is designed as elastic and/or as one piece, and/or is formed from a plastic.

11. The torsional vibration damper according to claim 7, wherein the two pendulum mass parts are connected to the connecting means as separate components.

12. A centrifugal pendulum device comprising:
a pendulum mass carrier including at least one pendulum mass being moveable between two end positions due to at least one guide element and having two mass parts connected via a connecting means; and
a damping element arranged on the at least one pendulum mass via which the at least one pendulum mass is supported before reaching at least one of the end positions, the damping element being held captively between the connecting means and the pendulum mass parts by a retaining groove designed in the damping element and an axial recess designed in the connecting means, wherein the damping element is insertable into the axial recess in an axial direction and displaceable inward in a radial direction by inserting one edge of the axial recess into the retaining groove transverse to the axial direction, and wherein the damping element is held on the at least one pendulum mass in opposing, first and second axial directions in the retaining groove by a stirrup of the connecting means such that a first outer section of the damping element is supported in the first axial direction and a second outer section of the damping element is supported in the second axial direction, wherein the damping element and the axial recess have the same shape of outer contour, wherein the outer contour of the axial recess is dimensioned larger than the outer contour of the damping element such that damping element is initially insertable into the axial recess in one of the opposing axial directions in order to displace the damping element inward in the radial direction upon reaching an insertion position, so that an edge of the stirrup is immersable in one of the opposing axial directions into the retaining groove within the damping element, and wherein the pendulum mass carrier has a carrier section and a support section on which the at least one pendulum mass is supported by the damping element, the support section being broadened relative to the carrier section by enlarging contact surface with the damping element and being designed as one piece with the carrier section, or is fastened on the carrier section as a separate component, the support section and/or the carrier section being formed from sheet metal.

\* \* \* \* \*